No. 695,980. Patented Mar. 25, 1902.
L. WILHELM.
MACHINE FOR DRILLING LENSES.
(Application filed Jan. 30, 1901.)
(No Model.)
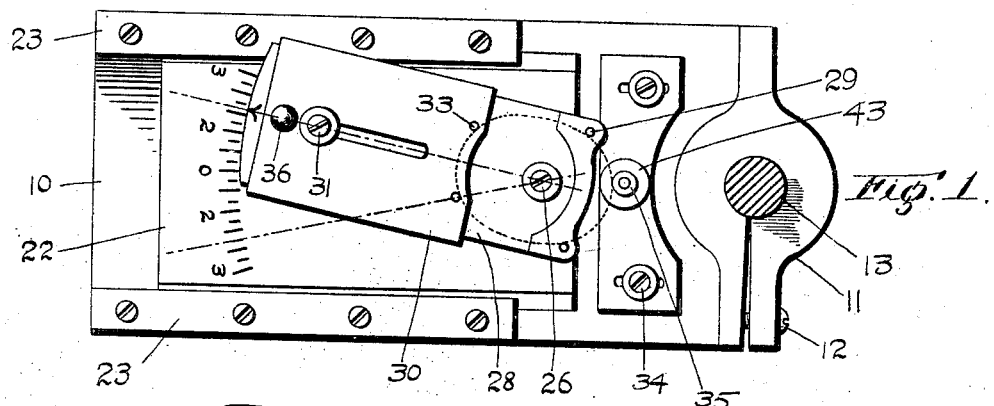
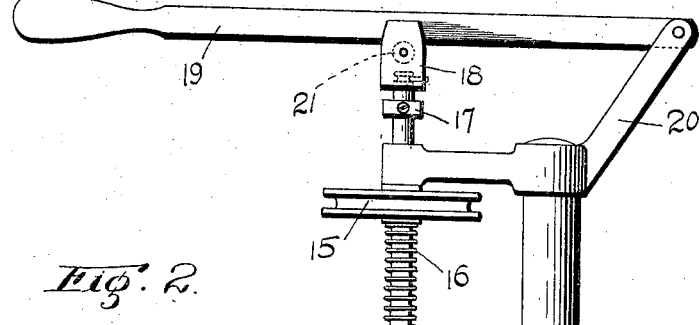
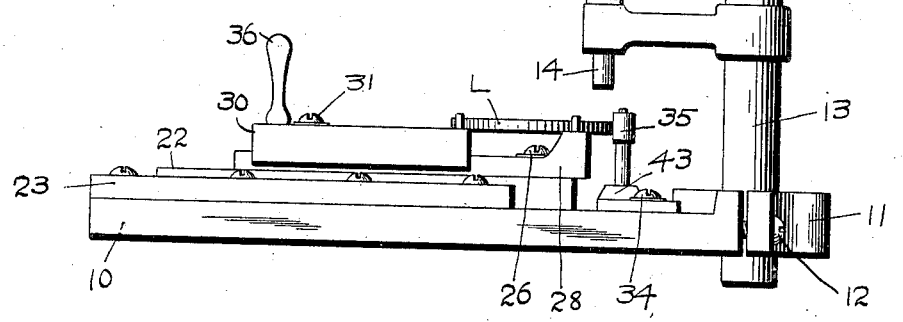
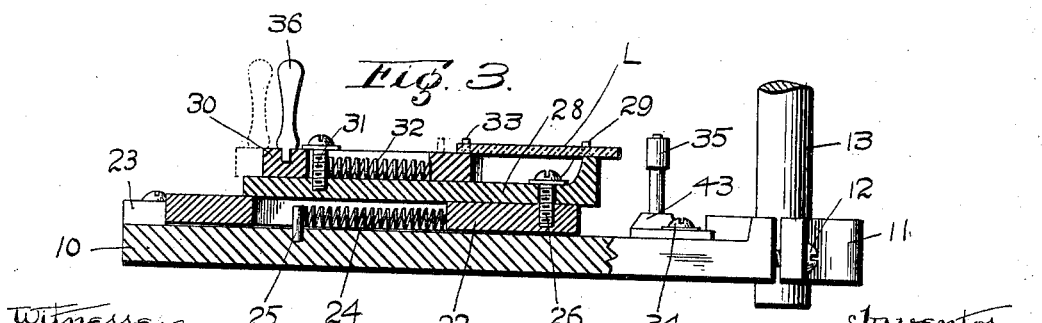

UNITED STATES PATENT OFFICE.

LOUIS WILHELM, OF SOUTHBRIDGE, MASSACHUSETTS, ASSIGNOR TO THE STANDARD OPTICAL COMPANY, OF GENEVA, NEW YORK, A CORPORATION OF NEW YORK.

MACHINE FOR DRILLING LENSES.

SPECIFICATION forming part of Letters Patent No. 695,980, dated March 25, 1902.

Application filed January 30, 1901. Serial No. 45,305. (No model.)

*To all whom it may concern:*

Be it known that I, LOUIS WILHELM, a subject of the Emperor of Germany, residing at Southbridge, in the county of Worcester and State of Massachusetts, have invented a new and useful Machine for Drilling Lenses, of which the following is a specification.

This invention relates to an apparatus for drilling spectacle or eyeglass lenses; and the especial objects of this invention are to provide an apparatus for holding and presenting lenses of different outlines in position, so that the holes drilled in such lenses will be a uniform distance from the perimeter, to provide for actuating the clamping mechanism by two springs of different relative stiffness, so that a lens will be first clamped in place between the holding-abutments and then automatically moved forward in position to be presented to the drill, to provide an adjustment for holding the lenses in position so that they may be drilled either above or below their central lines, and to provide a roller-bearing for the drill-spindle lever to insure a uniform drilling pressure.

To these ends this invention consists of the apparatus for drilling lenses as hereinafter described, and of the combinations of parts therein, as hereinafter described, and more particularly pointed out in the claims at the end of this specification.

In the accompanying drawings, Figure 1 is a plan view, partially in section, of an apparatus for drilling lenses constructed according to this invention. Fig. 2 is a side view of the same; and Fig. 3 is a similar view, partially broken away, so as to illustrate the arrangement of differential springs for first clamping the lens and then moving the same forward against the stop.

In manufacturing eyeglasses and spectacles, especially in manufacturing rimless glasses, it is necessary to drill the lenses to receive the rivets for securing the nose-guard pieces and the hinge-pieces or end fixtures to the lenses. Drilling holes through a lens is an exceedingly-delicate operation. In practice these holes are now ordinarily drilled with fine diamond drills, a hole being first started and drilled part way through from one side of a lens, and the lens being turned over and drilled through from the opposite side in order to prevent the glass from splintering or cracking, which is liable to happen if a hole is drilled completely through from one side. The operation of drilling a lens from one side and then from the other, as now ordinarily practiced, requires a high degree of skill for its performance and usually results in spoiling a considerable percentage of the work. Furthermore, in drilling lenses it is essential that the holes should be drilled so as to register accurately with the rivet-holes in the pieces or fixtures which are to be secured to the lenses.

In manufacturing eyeglasses or spectacles at the present time nearly all eyeglass and spectacle fixtures are made by machinery, so that when said fixtures are applied to lenses their rivet-holes are located a uniform distance from the edges or perimeters of the lenses.

In the apparatus which is now usually employed for drilling spectacle or eyeglass lenses a lens is first clamped in a holder or gig which is set or adjusted by hand into position to be engaged by the drill, and where the lenses vary in shape or outline they will occupy different positions in the clamp, so that a different adjustment is required for each different shape of lens which is to be drilled. When this form of apparatus is employed, the uniformity of the work necessarily depends upon the skill and care exercised by the operator.

One especial object of my invention is therefore to provide a construction which when once set to position will hold various shaped lenses, so that the holes drilled therein will all be a uniform distance from their edges. To accomplish this object, a lens-drilling apparatus constructed according to this invention is provided with a stop or gage-roll and with a slide or carriage for holding the edge of each lens up into engagement with the stop or gage-roll while the same is being drilled. The slide or carriage is normally moved forward by a coiled spring, and mounted on the slide or carriage is a secondary slide, which is moved forward by a somewhat stiffer spring than that employed for the main slide or carriage, and by means of this arrangement when the secondary slide is drawn back and a lens inserted into position the clamping-spring being the stronger will first act to clamp the lens in the holding-abutments, after which the weaker carriage-spring will move the lens forward to engage the gage-roll or stop, and in drawing back the secondary slide the action will be reversed, the lens being first moved away from the stop and then released from its clamp.

In its preferred construction the carriage of a lens-drilling apparatus constructed according to this invention is preferably provided with a swinging or transversely adjustable piece, which can be set to different positions when it is desired to drill a hole through a lens either above or below its center line, the movable piece being set to one side of its central position when drilling into one face of the lens and being set to the opposite side of its central position when drilling into the other side of the lens to complete the hole therethrough.

The drill may be of any ordinary or preferred construction; but in practice I preferably provide the connection between the drill-spindle and its lever with a roller-bearing for preventing friction between these parts and to insure a uniform drilling pressure.

Referring to the accompanying drawings and in detail, an apparatus for drilling lenses constructed according to this invention, as herein illustrated, comprises a base-piece or frame 10, having a split socket 11 at one end. Adjustably mounted in the split socket and clamped therein by a screw 12 is a vertically-adjustable drill-standard 13. Journaled in bearings carried by the drill-standard 13 is a drill-spindle 14, having a socket at its lower end in the ordinary way for receiving a small diamond or other form of drill. Mounted on the drill-spindle between its bearings is a grooved driving-pulley 15 and a coiled spring 16 for normally raising the drill-spindle. An adjustable stop-collar 17 is secured on the drill-spindle in position to be brought down into engagement with the upper bearing of the spindle, and swiveled on the upper end of the drill-spindle is a fork-piece 18, which receives an operating-lever 19, pivoted in a bracket 20, extending up from the drill-standard. The fork-piece 18 is preferably provided with a bearing-roll or friction-wheel 21, upon which the operating-lever 19 rests, so that the operating-lever will not cramp or bind on the fork-piece and so that a uniform drilling-pressure may be exerted on the drill-spindle.

The construction employed for clamping the lenses and automatically presenting them in position to be drilled comprises a main slide or carriage 22, which slides in ways or gibbed pieces 23, screwed onto the base-piece or frame 10. As shown in Fig. 3, the carriage or slide 22 is provided with a slot, mounted in which is a spring 24, having its rear end resting against a stud or pin 25, so as to normally force the carriage or slide 22 forward.

Pivotally mounted on the carriage or slide 22, by means of a screw 26, is an adjustable piece 28, which may be swung or set to different relative positions and which may be regulated by means of graduations or a scale, as illustrated in Fig. 1. The adjustable piece 28 is provided near its front end with small pins or clamping-abutments 29. The pins 29 may, if desired, be made in the form of small rollers to diminish the friction in centering a lens therein.

Fitting over the adjustable piece 28 is a secondary slide 30, which is slotted longitudinally and held in place by a screw 31. A somewhat-stronger coiled spring 32 is mounted in the secondary slide 30 and tends to move the same forward. The secondary slide 30 is provided with clamping pins or abutments 33, coöperating with the clamping-pins 29, and extending up from the secondary slide is an operating handle or finger 36. Coöperating with this lens carrying and clamping construction is a stop or gage-roll 35.

As herein illustrated, an adjustable piece 43 is secured on the frame or base-piece 10 by screws 34, and extending up from the adjustable piece 43 is a spindle, journaled on which is a gage-roll or stop 35. By means of this construction, as illustrated in Fig. 3, after a lens, as L, has been drilled part way through from one side by drawing back the handle 36 to the position illustrated in Fig. 3 the lens will be moved back from its gage-roll or stop, and by moving said handle still farther back to the position illustrated by dotted lines the lens will be released from the clamping-abutments, and when turned over or another lens substituted therefor the release of the handle 36 will allow the clamping-spring to first clamp the lens in place, after which the weaker carriage-spring will move the same forward into contact with the gage-roll or stop, as illustrated in Fig. 2. By means of this construction the lenses will all be drilled a uniform distance from their edges, and as this is accomplished automatically an apparatus for drilling lenses constructed according to my invention will produce larger quantities and better grades of work and with a less amount of breakage than with constructions which have heretofore been employed.

I am aware that changes may be made in the construction of my apparatus for drilling lenses by those who are skilled in the art without departing from the scope of my invention as expressed in the claims. I do not wish, therefore, to be limited to the construction which I have herein shown and described; but What I do claim, and desire to secure by Letters Patent of the United States, is—

1. In an apparatus for drilling spectacle or eyeglass lenses, the combination of a longitudinally-movable drill-spindle, a gage-roll or stop, a slide or carriage having abutments, a clamping-slide also having pins or abutments, said two sets of pins or abutments coöperating to hold a lens while the same is being drilled, a spring for normally moving forward the main slide or carriage, and a stronger spring for moving forward the clamping-slide, said parts being arranged so that when the clamping-slide is retracted the lens will first be drawn back from its stop before being released from the clamping-abutments, substantially as described.

2. In an apparatus for drilling spectacle or eyeglass lenses, the combination of a longitudinally-movable drill-spindle, a gage-roll or stop arranged to be engaged by the edge of the lens being drilled, a slide or carriage, an adjustable piece mounted on the slide or carriage, so that the same can be swung or adjusted transversely on the carriage, a secondary slide mounted on said adjustable piece, and clamping pins or abutments mounted on the adjustable piece and secondary slide respectively for clamping a lens and holding the same up into engagement with its stop while being drilled, substantially as described.

3. In an apparatus for drilling spectacle or eyeglass lenses, the combination of a longitudinally-movable drill-spindle, a gage-roll or stop arranged to be engaged by the edge of the lens being drilled, a slide or carriage, an adjustable piece mounted on the slide or carriage so that the same can be swung or adjusted transversely, a secondary slide mounted on said adjustable piece, clamping pins or abutments carried by the adjustable piece and secondary slide respectively, a spring normally tending to move the carriage forward, and a stronger spring for moving forward the secondary slide, said parts being arranged so that when the secondary slide is retracted the lens will first be drawn back from the stop before being released from the clamping-abutments, substantially as described.

4. In an apparatus for drilling spectacle or eyeglass lenses, the combination of a base-piece or frame, a drill-standard, a vertically-movable drill-spindle mounted therein an adjustable piece having a gage-roll or stop, screws for clamping the gage-roll or stop in its adjusted position, a carriage or slide, an adjustable piece pivotally mounted on said carriage, said parts being graduated so that the adjustable piece may be set to corresponding positions at each side of the central line of the carriage, a secondary slide mounted on the adjustable piece, a screw for holding the secondary slide in place, pins or clamping-abutments extending up from the adjustable piece and secondary slide respectively, a spring for moving forward the carriage, and a stronger spring for moving forward the secondary slide, said parts being arranged so that when the secondary slide is retracted the lens will first be drawn back from its stop before being released from the clamping-abutments, substantially as described.

5. In an apparatus for drilling spectacle or eyeglass lenses, the combination of a base-piece, a drill-standard adjustably mounted therein, a drill-spindle journaled in bearings carried by the drill-standard, a fork-piece secured on the upper end of the drill-spindle, a friction-roll journaled in the fork-piece, a forked lever fitting into the fork-piece and engaging the friction-roll, a gage-roll or stop, a carriage or slide mounted on the base-piece, a secondary slide, pins or clamping-abutments carried by the carriage and secondary slide respectively, a spring for moving forward the carriage, and a stronger spring for moving forward the secondary slide, said parts being arranged so that when the secondary slide is retracted the lens will first be drawn back from its stop before being released from the clamping-abutments, substantially as described.

In testimony whereof I have hereunto set my hand in the presence of two subscribing witnesses.

LOUIS WILHELM.

Witnesses:
 GEORGE H. WYMAN,
 A. J. MCKINSTRY.